United States Patent [19]

Brown

[11] Patent Number: 4,585,905
[45] Date of Patent: Apr. 29, 1986

[54] OVERVOLTAGE PROTECTION CIRCUIT FOR SLIC

[75] Inventor: Leland T. Brown, Phoenix, Ariz.

[73] Assignee: Motorola, Inc., Schaumburg, Ill.

[21] Appl. No.: 523,313

[22] Filed: Aug. 15, 1983

[51] Int. Cl.$^4$ .......................... H02H 3/20; H04M 7/00
[52] U.S. Cl. ............................. 179/16 AA; 179/27 G; 361/91
[58] Field of Search ............. 179/16 AA, 18 G, 27 G, 179/81 R; 361/56, 91, 111

[56] References Cited
U.S. PATENT DOCUMENTS 4,377,832 3/1983 Toney et al. ..................... 361/111

Primary Examiner—James L. Dwyer
Attorney, Agent, or Firm—Joe E. Barbee

[57] ABSTRACT

A high impedance open circuit type of overvoltage protection circuit useful in conjunction with a SLIC is provided. Diodes are used to prevent current flow back into the SLIC. In addition, voltage-sensitive clamps are provided to clamp the SLIC current source and SLIC current sink into nonconductive states in the presence of an overvoltage condition.

6 Claims, 1 Drawing Figure

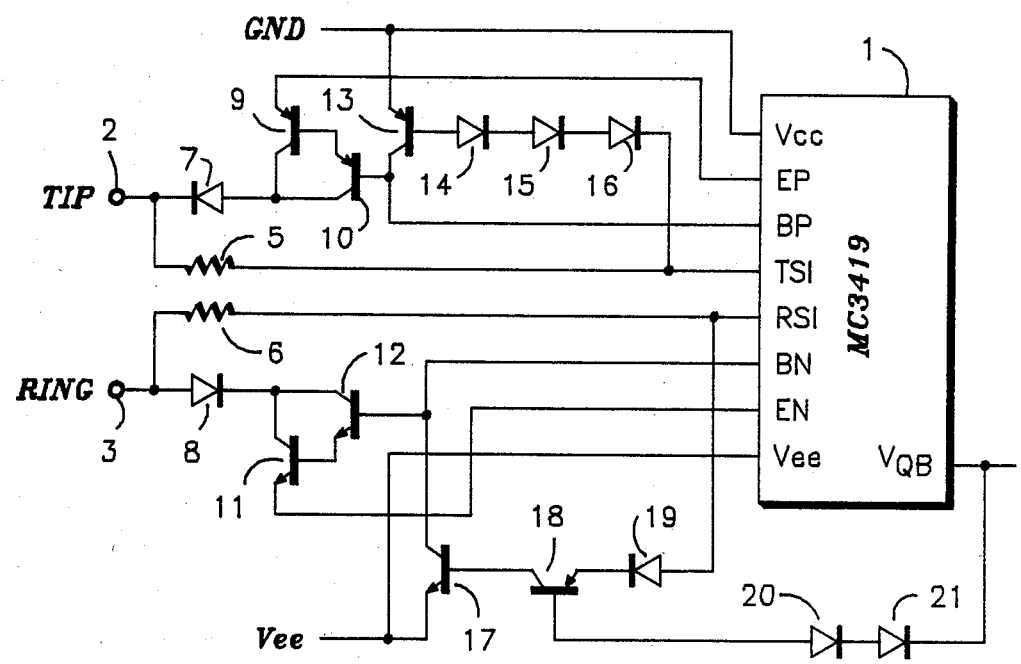

OVERVOLTAGE PROTECTION CIRCUIT FOR SLIC

The present invention relates, in general, to telephone subscriber loops, and more particularly, to an overvoltage protection circuit for a subscriber loop interface circuit (SLIC).

In the past a subscriber loop interface circuit included a hybrid transformer circuit. The hybrid transformer circuit performed a two-wire to four-wire conversion. More recently, the hybrid transformer circuit has been replaced by a subscriber loop interface circuit commonly called a SLIC. The SLIC is now widely used in central office, PABX, and subscriber carrier equipment providing signal separation for two-wire differential to four-wire single ended conversions and suppression of longitudinal signals at the two-wire input. The SLIC also provides DC line current for powering the telephone set. The SLIC has a Tip terminal and a Ring terminal which are connected to the telephone set. Occasionally the lines hooked to the Tip and Ring terminals experience an overvoltage surge caused by transients from adjacent equipment, lightning, or the such. Various protective devices have been used in order to prevent these voltage surges from damaging the SLIC. The most popular technique seems to be connecting a four-diode bridge between the battery supply voltage and ground to the Tip and Ring terminals. This overvoltage technique works satisfactorily in many applications; however, in the situation where many subscriber loops are connected to the same battery an overvoltage condition could result in damage to the battery since the current surge produced by the overvoltage condition is shunted through the battery itself.

Accordingly, it is an object of the present invention to provide an improved overvoltage protection circuit for a SLIC.

Yet another object of the present invention is to provide a SLIC overvoltage protection circuit which blocks current created by overvoltage surges from entering the SLIC.

Yet a further object of the present invention is to provide an overvoltage protection circuit for SLIC which results in a high impedance open circuit during an overvoltage surge.

SUMMARY OF THE INVENTION

In achieving the above and other objects and advantages of the present invention there is provided, in one form, a unidirectional current blocking device between the Tip terminal and the current source of a SLIC. Means to inhibit the current source are also provided. The means inhibits the current source upon sensing of an overvoltage condition. A unidirectional current blocking device is also provided between the Ring terminal and the current sink of the SLIC. Means for inhibiting the current sink upon sensing an overvoltage condition is also provided.

The subject matter which is regarded as the present invention is set forth in the appended claims. The invention itself, however, together with further objects and advantages thereof, may be better understood by referring to the following detailed description taken in conjunction with the accompanying drawing.

BRIEF DESCRIPTION OF THE DRAWING

The single FIGURE illustrates in schematic form an embodiment of the overvoltage protection circuit for the SLIC.

The exemplification set out herein illustrates the preferred embodiment of the invention in one form thereof, and such exemplification is not to be construed as limiting in any manner.

DESCRIPTION OF THE PREFERRED EMBODIMENT

The single figure illustrates how the overvoltage protection circuit of the present invention can be used with an MC3419 subscriber loop interface circuit (SLIC). MC3419 is a part made and sold by Motorola Inc. All of the interface pins of the SLIC are not shown since they are not needed to explain the present invention. The MC3419 SLIC is a telephone line feed and two- to four-wire conversion circuit. The four-wire side of the SLIC generally contains a transmit line, a receive line, and a ground line which is common for each one of the transmit and receive lines. The two-wire side of the SLIC is the Tip and Ring lines which handle a balanced differential signal and provide DC line current for powering the telephone set.

The SLIC has a VCC pin which is connected to ground, an EP pin which is connected to an emitter of a PNP transistor 9, a BP pin which is connected to the base of a PNP transistor 10, a TSI pin which is the Tip current sensing input, an RSI pin which is the Ring current sensing input, a BN pin which is connected to the base of an NPN transistor 12, an EN pin which is connected to the emitter of an NPN transistor, a VEE pin which is a power supply pin and is normally connected to a battery, which in many cases is negative 48 volts, and a VQB pin which is a quiet battery connection having a voltage which is generally more positive than VEE. As mentioned hereinbefore the other pins required for the SLIC are not shown since they are not required for an understanding of this invention.

Tip terminal 2 is coupled to the TSI pin by Tip sense resistor 5. Resistor 5 senses the voltage at Tip terminal 2 and provides a current to the TSI pin. Tip terminal 2 is also connected to the cathode of diode 7. Diode 7 has its anode connected to the common collector junction of Darlington transistor pair 9 and 10. Transistors 9 and 10 are both PNP transistors. The base of transistor 10 besides being connected to the BP pin is also connected to the collector of a PNP transistor 13. The emitter of transistor 13 is connected to ground pin VCC. The base of transistor 13 is connected to the anode of a diode 14 which has its cathode connected to the anode of a diode 15. Diode 15 has its cathode connected to the anode of a diode 16. Diode 16 has its cathode connected to the TSI pin which allows the base of transistor 13 through diodes 14, 15, and 16 to be biased on by an overvoltage condition.

Ring terminal 3 is connected to the anode of diode 8 and coupled to the RSI pin by Ring sense resistor 6. The cathode of diode 8 is connected to a common collector junction of NPN Darlington pair transistors 11 and 12. The base of transistor 12 besides being connected to the BN pin is also connected to a collector of an NPN transistor 17. Transistor 17 has its emitter connected to VEE, and its base connected to a collector of a transistor 18. PNP transistor 18 has its emitter connected to the cathode of diode 19, and its base connected to the anode of a diode 20. Diode 19 has its anode connected to the RSI pin to sense the voltage from resistor 6. Diode 20 has its cathode connected to the anode of a diode 21. Diode 21 has its cathode connected to the VQB pin.

Darlington pair 9 and 10 source DC current to the loop through Tip terminal 2 while Darlington pair 11 and 12 sink DC current from the loop through Ring terminal 3. The loop includes Darlington transistors 9 and 10, Tip terminal 2, the telephone set (not shown), Ring terminal 3, and Darlington transistors 11 and 12. Diodes 14, 15, and 16 are in series with the base electrode of transistor 13 to overcome or offset an equivalent voltage drop inside of the SLIC. Diodes 19, 20, and 21 are also used to overcome an equivalent offset voltage inside of the SLIC. Diodes 7 and 8 serve as unidirectional current flow devices and are inside the feedback loop. By being inside the feedback loop they do not interfere with the voltage as sensed by resistors 5 and 6. Resistors 5 and 6 sense both AC and DC voltages wherein AC is typically the signal voltage and DC is the power voltage to the telephone set. Transistor 13 along with diodes 14, 15, and 16 serve to handle an abnormal voltage or voltage surge appearing on Tip terminal 2. Transistor 13 clamps the base of Darlington transistor 10 to ground when an overvoltage condition occurs. In a similar manner, transistors 17 and 18 along with diodes 19, 20, and 21 serve as an overvoltage protection for Ring terminal 3. Transistor 17 serves to clamp the base electrode of Darlington transistor 12 to VEE, and transistor 18 serves as a clamp driver. In a preferred embodiment, transistors 9, 10, 11, and 12 are all high voltage transistors since the present overvoltage protection circuit is a high impedance open circuit. The common prior art overvoltage protection circuit which used a four-diode bridge was a low-voltage clamp which passed the current from the overvoltage surge through the batteries. In such a system the Darlington transistors did not have to be high-voltage transistors. Another advantage of the present overvoltage protection circuit is that it can be fully integrated into the SLIC.

In operation, a positive voltage surge on Tip terminal 2, for example, causes series diode 7 to reverse bias thereby blocking any current flow into the SLIC through current source Darlington pair 9 and 10. Since resistors 5 and 6 are relatively high in resistance they afford sufficient protection to the TSI and RSI pins, respectively. A negative-voltage surge on Tip terminal 2 causes diode 7 to forward bias resulting in increased current flow through Darlington pair 9 and 10. Darlington pair 9 and 10 can synthesize several hundred ohms, and the voltage dropped across the pair increases proportionately with the current. Eventually the current flow through sense resistor 5 causes sufficient voltage drop to forward bias the string of diodes 14 through 16 along with transistor 13. This will turn on clamping transistor 13 which in turn causes Darlington pair 9 and 10 to turn off thereby shutting off the current flow in Ring terminal 2 with the exception of the slight current flowing through sense resistor 5, diodes 14, 15 and 16 and transistor 13.

The overvoltage protection on Ring terminal 3 works in a similar fashion. A negative voltage surge on Ring terminal 3 causes diode 8 to reverse bias thereby temporarily blocking current flow into Darlington pair 11 and 12. A positive overvoltage surge on Ring terminal 3 will cause diode 8 to forward bias resulting in current flow through Darlington pair 11 and 12. As above, the current flow through sense resistor 6 is proportional to the voltage until there is a sufficient voltage drop at the RSI pin with respect to the VQB pin to forward bias diode string 19, 20, and 21 along with transistor 18. Once transistor 18 is biased on it will enable clamping transistor 17 which will cause Darlington pair 11 and 12 to turn off. This opens up Ring terminal 3.

By now it should be appreciated that there has been provided a novel and improved overvoltage protection circuit which has relatively few circuit components, can be mostly integrated onto a SLIC integrated circuit, and avoids the problems associated with a diode bridge. In addition, added diodes 7 and 8 are inside the feedback loop to avoid interfering with the voltages sensed, and the overvoltage protection circuit offers a high impedance open circuit. This invention takes advantage of the existing Ring and Tip sense resistors to sense when an overvoltage condition occurs.

I claim:

1. An overvoltage protection circuit for a subscriber loop interface circuit (SLIC) having a Tip and a Ring terminal, the overvoltage protection circuit comprising: a current source; a first unidirectional current means coupled between the current source and the Tip terminal; a first voltage sensor coupled to the Tip terminal; first clamp means coupled to the first voltage sensor and to the current source for disabling the current source upon the first voltage sensor sensing a predetermined voltage; a current sink coupled to the Ring terminal; a second unidirectional current means coupled between the current sink and the Ring terminal; a second voltage sensor coupled to the Ring terminal; and second clamp means coupled to the second voltage sensor and the current sink to controllably inhibit the current sink.

2. The overvoltage protection circuit of claim 1 further including a clamp driver means coupled between the second voltage sensor and the second clamp means.

3. The overvoltage protection circuit of claim 1 wherein the current source and the current sink are each a pair of high voltage transistors connected in a Darlington configuration.

4. The overvoltage protection circuit of claim 3 wherein the first and second unidirectional current means are each a diode wherein the first unidirectional current means has its cathode connected to the Tip terminal and the second unidirectional current means has its anode connected to the Ring terminal; and wherein the first and second voltage sensors are resistors.

5. The voltage protection circuit of claim 3 wherein the first and second clamp means each include a transistor.

6. A method for protecting a two-wire port of a SLIC from an overvoltage surge, comprising: blocking the overvoltage surge of a first polarity from entering a current source port of the SLIC; sensing voltage at the current source port of the SLIC and inhibiting the current source upon sensing a predetermined overvoltage of a second polarity at the current source port; blocking current flow caused by an overvoltage of the second polarity from a current sink port; and inhibiting the current sink port upon sensing a predetermined overvoltage surge of the first polarity.

* * * * *